(12) United States Patent
Le Corre

(10) Patent No.: US 10,569,686 B2
(45) Date of Patent: Feb. 25, 2020

(54) DEVICE FOR FIXING A TABLE TOP

(71) Applicant: ALSTOM Transport Technologies, Saintouen (FR)

(72) Inventor: Dominique Le Corre, Pfaffenhoffen (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 16/133,740

(22) Filed: Sep. 18, 2018

(65) Prior Publication Data

US 2019/0084461 A1    Mar. 21, 2019

(30) Foreign Application Priority Data

Sep. 18, 2017 (FR) ..................... 17 58626

(51) Int. Cl.

| | |
|---|---|
| B60N 3/00 | (2006.01) |
| B60R 21/02 | (2006.01) |
| A47B 5/00 | (2006.01) |
| B60N 2/427 | (2006.01) |
| A47B 13/08 | (2006.01) |
| B60N 2/42 | (2006.01) |
| B61D 37/00 | (2006.01) |
| A47B 31/06 | (2006.01) |

(52) U.S. Cl.
CPC ................ B60N 3/001 (2013.01); A47B 5/00 (2013.01); A47B 13/081 (2013.01); B60N 2/4214 (2013.01); B60N 2/42709 (2013.01); B60R 21/02 (2013.01); B61D 37/00 (2013.01); *A47B 31/06* (2013.01)

(58) Field of Classification Search
CPC ........... A47B 96/06; A47B 5/00; A47B 31/06; B60N 3/001
USPC ...................... 108/42, 47, 152; 248/235, 250
See application file for complete search history.

(56) References Cited

U.S. PATENT DOCUMENTS

| | | | | |
|---|---|---|---|---|
| 4,508,301 A | * | 4/1985 | Nicholson ............ | A47B 96/065 108/152 |
| 4,934,642 A | * | 6/1990 | Baron .................. | A47B 96/065 108/108 |
| 5,020,758 A | * | 6/1991 | Rawlyk ................ | A47B 96/063 108/108 |

(Continued)

FOREIGN PATENT DOCUMENTS

| | | |
|---|---|---|
| WO | 2011/009679 A1 | 1/2011 |
| WO | 2014/1480651 A1 | 11/2014 |

OTHER PUBLICATIONS

FR Search Report, dated May 17, 2018, from corresponding FR 1 758 626 application.

*Primary Examiner* — Jose V Chen
(74) *Attorney, Agent, or Firm* — Young & Thompson

(57) ABSTRACT

A device for fastening a table top to a side wall of a vehicle includes: a structure for fastening to the side wall, and a support structure of the plate. The support structure includes: at least one crosspiece extending along a transverse direction, and at least two beams each extending in a longitudinal direction substantially orthogonal to the transverse direction, with the crosspiece being connected to each of the beams. The support structure includes bending onset zones configured to deform plastically when a force greater than or equal to a predetermined threshold force is applied on the support structure along the transverse direction.

11 Claims, 2 Drawing Sheets

(56) References Cited

U.S. PATENT DOCUMENTS

| | | | | |
|---|---|---|---|---|
| 5,775,655 | A * | 7/1998 | Schmeets | A47B 5/00 |
| | | | | 108/115 |
| 6,026,601 | A * | 2/2000 | Kiel | A47B 5/00 |
| | | | | 108/47 |
| 6,105,794 | A * | 8/2000 | Bauer | A47B 57/26 |
| | | | | 108/108 |
| 6,827,320 | B2 * | 12/2004 | Yeh | A47B 57/565 |
| | | | | 248/220.22 |
| 8,282,178 | B2 * | 10/2012 | Bradley | F25D 25/02 |
| | | | | 108/108 |
| 87,570,068 | | 6/2014 | Schmidt | |
| 9,580,085 | B2 | 2/2017 | Schmidt | |
| 9,655,443 | B2 * | 5/2017 | Cano | A47B 57/404 |
| 2002/0145315 | A1 * | 10/2002 | Fraley | B60N 2/4214 |
| | | | | 297/216.13 |
| 2009/0249982 | A1 * | 10/2009 | Palethorpe | A47B 5/00 |
| | | | | 108/44 |
| 2010/0102170 | A1 * | 4/2010 | LaConte | B64D 11/06 |
| | | | | 244/122 R |
| 2011/0206894 | A1 * | 8/2011 | Tsai | B32B 3/02 |
| | | | | 428/116 |
| 2014/0055017 | A1 * | 2/2014 | McMillin | A47B 96/027 |
| | | | | 312/237 |
| 2016/0051056 | A1 * | 2/2016 | Port | A47C 1/12 |
| | | | | 108/42 |
| 2016/0166055 | A1 * | 6/2016 | Bo | A47B 5/04 |
| | | | | 108/42 |

* cited by examiner

DEVICE FOR FIXING A TABLE TOP

CROSS-REFERENCE

This claims the benefit of French Patent Application FR 17 58626, filed Sep. 18, 2018 and hereby incorporated by reference herein.

TECHNICAL FIELD OF THE INVENTION

The present invention relates to a device for fixing a table top, of the type including:
- a structure for fastening to the side wall,
- a support structure for the table top, defining a support surface extending in a substantially horizontal plane, the support structure comprising:
  - at least one crosspiece extending along a transverse direction,
  - at least two beams each extending between a junction end to said crosspiece and a fastening end to said fastening structure in a longitudinal direction substantially orthogonal to the transverse direction,
- said crosspiece being connected to each of said beams.

BACKGROUND OF THE INVENTION

Devices of the aforementioned type are known. Such a device is in particular used to fasten a table top to a side wall of a railway vehicle. A table top thus fastened provides a relatively stable horizontal surface, and may next be used by the passengers as a support, in particular for books, computers or food.

Such a device is not fully satisfactory. Indeed, when an unexpected event occurs that requires an abrupt deceleration of the vehicle, passengers are sometimes not prepared, and may collide with the table tops. At worst, strong collisions between passengers and table tops may occur and cause serious injuries to passengers.

One aim of the invention is to provide a table top fastening device and a table not having these drawbacks, in particular that limit the risk of injury to passengers in case of collision.

SUMMARY OF THE INVENTION

To that end, the invention relates to a device of the aforementioned type, in which the support structure includes bending onset zones configured to deform plastically when a force greater than or equal to a predetermined threshold force is applied on said support structure along the transverse direction, the bending onset zones allowing pivoting of each of said beams relative to said crosspiece around a pivot axis orthogonal to said transverse and longitudinal directions when a force greater than or equal to said predetermined bending force is applied on said support structure along the transverse direction.

In specific embodiments of the invention, the device further has one or more of the following features, considered alone or according to any technically possible combination (s):
- the bending onset zones include two first bending onset zones, each arranged near a junction end between a respective beam and said crosspiece, and two second bending onset zones, said first and second bending onset zones defining a substantially rectilinear profile when no force is exerted on said support structure, each second bending onset zone being arranged on a respective beam.
- each beam includes a movable portion, extending from the second bending onset zone arranged on said beam to the junction end of said beam, and a stationary portion, extending from the second bending onset zone to the fastening end of said beam, said second bending onset zones authorizing pivoting of the movable portion of each of said beams relative to the stationary portion around a pivot axis orthogonal to said transverse and longitudinal directions when a force greater than or equal to said predetermined threshold force is applied on said support structure along the longitudinal direction.
- the bending onset zones include two first bending onset zones, each arranged near a junction end between a respective beam and said crosspiece, and two second bending onset zones, said first and second bending onset zones defining a substantially rectilinear profile when no force is exerted on said support structure,
- the fastening structure includes two uprights each extending from the fastening end of one of said beams, substantially orthogonally to said beam, said uprights being intended to be fastened to the side wall of the vehicle, each second bending onset zone being arranged on a respective upright.
- each upright includes a transverse wall for fastening to the side wall of the vehicle, and a longitudinal wall extending along the longitudinal direction of the transverse wall up to the fastening end of one of said beams, and each second bending onset zone is arranged near a connecting zone between the longitudinal wall and the transverse wall of the respective upright.
- at least one of the bending onset zones is formed by a thinner zone of the crosspiece and/or the beam, the thinner zone having a thickness smaller than an average thickness of the crosspiece and beams or formed by a zone of the crosspiece and/or beam comprising recesses, in particular circular recesses.
- the fastening device further includes a side angle iron intended to be fastened to the side wall across from one end of an edge of the table top.
- the device is made in a single piece.

The invention also relates to a table for a vehicle, said table including a fastening device according to the invention and the table top, the table top resting on the support surface, initial gap being present between the angle iron and the table when no force is exerted on said support structure, said gap being able to decrease substantially to zero after the plastic deformation of at least one bending onset zone, the width of the initial gap advantageously being between 10 and 20 millimeters.

The table may also include an element for fastening the crosspiece to the bottom surface of the table top, the fastening element being located substantially at the center of the width of the table top, the fastening element being of the bracket type.

BRIEF DESCRIPTION OF THE DRAWINGS

Other features and advantages of the invention will appear upon reading the following description, provided solely as an example and done in reference to the appended drawings, in which.

DETAILED DESCRIPTION OF SOME EMBODIMENTS

Figure 1:
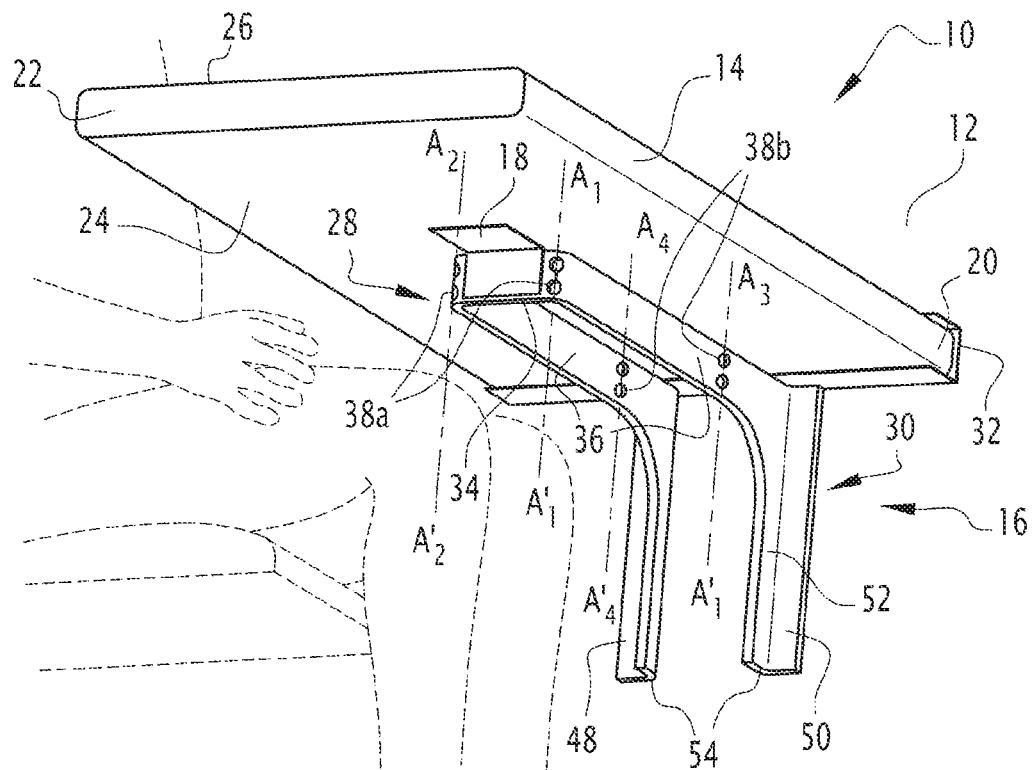
FIG. 1 is a perspective view of a table including a fastening device according to the invention during operation, a table top being mounted on the device.
Figure 2:
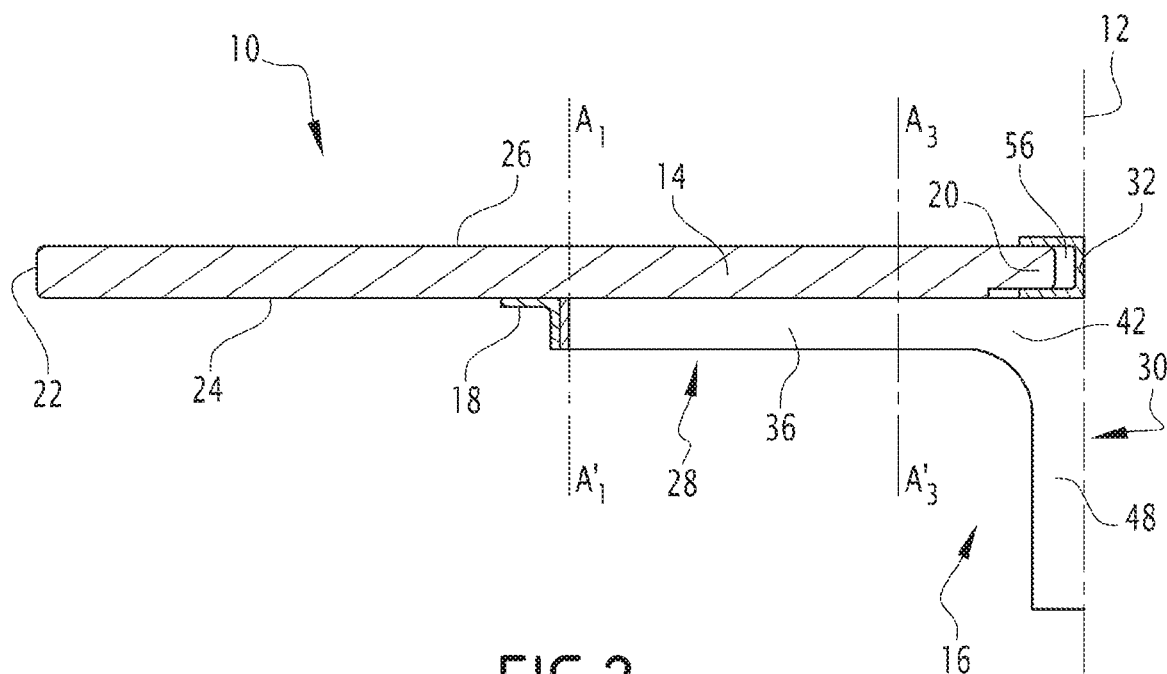
FIG. 2 is a side view of the table of FIG. 1.

The table 10 is typically mounted on a side wall 12 of a railway vehicle. The table 10 comprises a substantially horizontal top 14, a fastening device 16, and a fastening element 18.

The table top 14 extends longitudinally between a first end edge 20 across from the side wall 12, and a second end edge 22 opposite the first end edge 20.

The second end edge 22 is for example across from an aisle of a railway vehicle.

Hereinafter, "longitudinal" will refer to a direction or plane intended to extend, during use, orthogonally to the side wall of the railway vehicle, and "transverse" to a direction or plane intended to extend, during use, parallel to the side wall of the railway vehicle and in a horizontal plane.

The top 14 also has a bottom surface 24 intended to be in contact with the top face of the fastening device 16 and with the top surface of the fastening element 18, and a top surface 26 opposite the bottom surface 24, able to support objects.

The fastening device 16 comprises a support structure 28 for the top 14, a fastening structure 30 to the side wall 12, and a side angle iron 32 across from the first end 20 of the top 14.

Advantageously, the fastening device 16 is made in a single piece. It is for example made up of a cut and bent metal sheet.

The support structure 28 defines a support surface, extending in a substantially horizontal plane, during use. Advantageously, the support surface extends in a plane parallel to the bottom surface 24 of the top 14.

The table top 14 rests on the support surface.

The support structure 28 and the fastening structure 30 are advantageously made from metal, for example steel or aluminum. In one configuration, the support structure 28 and the fastening structure 30 are advantageously made from a same material. In another configuration, they are made from different materials.

The support structure 28 comprises at least one crosspiece 34 extending along a transverse direction.

The support structure 28 further comprises at least two beams 36 extending in a longitudinal direction.

The support structure 28 further comprises bending onset zones 38.

The crosspiece 34 is connected to each of the beams 36.

In particular, the two beams 36 each extend longitudinally between a junction end 40 to the crosspiece 34 and a fastening end 42 to the fastening structure 30.

Thus, the crosspiece 34 is connected to the junction and 40 of each of the beams 36.

The bending onset zones 38 are configured to deform plastically when a force greater than or equal to a predetermined threshold force is applied on the support structure 28 along the transverse direction. Advantageously, the bending onset zones 38 allow pivoting of each of the beams 36 relative to the crosspiece 34 around a respective pivot axis A-A' orthogonal to the transverse and longitudinal directions when a force greater than or equal to said predetermined threshold force is applied on the support structure 28 along the transverse direction.

Advantageously, the bending onset zones 38 include two first bending onset zones 38a, and two second bending onset zones 38b.

The first bending onset zones 38a are each arranged near the junction end 40 between a respective beam 36 and the crosspiece 34.

The second bending onset zones 38b are arranged on a respective beam 36.

Figure 3:
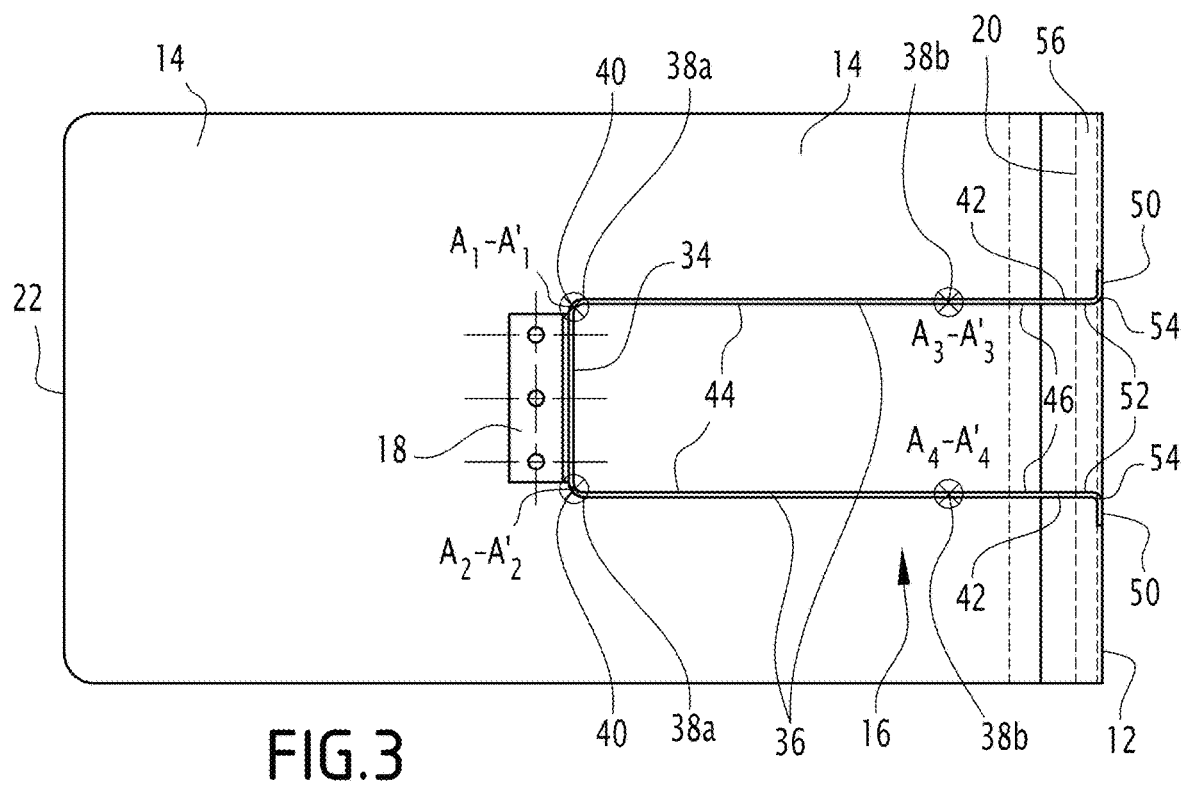
FIG. 3 is a bottom view of the table of FIG. 1, when no force is exerted on the side of the device.
Figure 4:
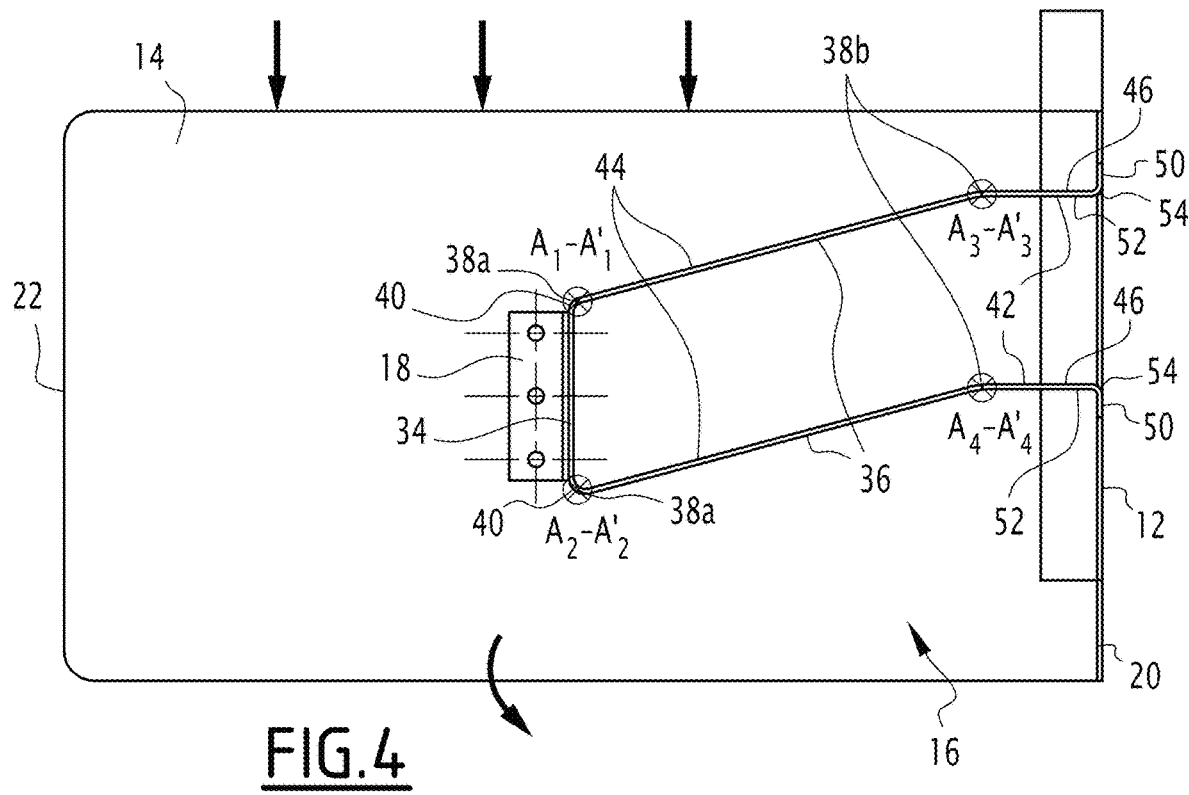
FIG. 4 is a view similar to FIG. 3, the fastening device being plastically deformed after the application of a force greater than or equal to a predetermined threshold force on the side of the device.

As illustrated in FIG. 3, the first and second bending onset zones 38a,b define a substantially rectangular profile when no force is exerted on the support structure 28.

Each beam 36 includes a movable portion 44 and a stationary portion 46.

The movable portion 44 extends from the second bending onset zone 38b to the junction end 40. The stationary portion 46 extends from the second bending onset zone 38b to the fastening end 42.

The second bending onset zones 38b authorize pivoting of the movable portion 44 of each of the beams 36 relative to the stationary portion 46 around a respective pivot axis A-A' orthogonal to the transverse and longitudinal directions when a force greater than or equal to said predetermined threshold force is applied on the support structure 28 along the transverse direction.

After the plastic deformation of the bending onset zones 38, the first and second bending zones 38a,b define a parallelogram-shaped profile (non-rectangular). Thus, the support structure 28 is substantially in the shape of a parallelogram in a horizontal plane. The fastening structure 30 includes two uprights 48 each extending substantially orthogonally to the beam 36 from the fastening end 42 of the beam 36.

The uprights 48 are intended to be fastened to the side wall 12 of the vehicle.

Each upright 48 includes a transverse wall 50 for fastening to the side wall 12 of the vehicle, and a longitudinal wall 52 extending along the longitudinal direction of the transverse wall 50 up to the fastening end 42 of a beam 36.

In one alternative, each second bending onset zone 38b is arranged on a respective upright 48. Advantageously, each second bending onset zone 38b is arranged near a connecting zone 54 between the transverse wall 50 and the longitudinal wall 52 of the respective upright 48.

The material of the bending onset zones 38 is made fragile so as to allow their plastic deformations when a force greater than or equal to the predetermined threshold force is applied on the support structure 28 along the transverse direction, without causing the plastic deformation of the other parts.

In one configuration, at least one of the bending onset zones 38 is formed by a thinner zone of the crosspiece 34 and/or the beam 36. The thinner zone has a thickness smaller than an average thickness of the crosspiece 34 and beams 36, for example 25% to 75% smaller.

In another configuration, at least one of the bending onset zones 38 is a zone of the crosspiece 34 and/or the beam 36 comprising recesses. These recesses are for example circular.

The side angle iron 32 is intended to be fastened to the side wall 12 across from the first end 20 of an edge of the table top 14.

During the plastic deformation of at least one bending onset zone 38, the table top 14 is guided in circular translation in the side angle iron 32.

Gap 56 appears between the angle iron 32 and the table top 14.

When no force is exerted on the support structure 28, the gap 56 has an initial width. Typically, the thickness is comprised between 10 and 20 millimeters.

After the plastic deformation of at least one bending onset zone 38, the width of the gap 56 decreases substantially to zero. When the table top 14 comes back into lateral contact with the bottom of the angle iron 32, the top 14 can no longer advance, which makes it possible to control the maximum movement of the table 10 so as not to injure the passengers seated on the seats across from the movement direction of the top 14.

The fastening element 18 is intended to fasten the crosspiece 34 to the bottom surface 24 of the table top. Advantageously, the fastening element 18 is located substantially at the center of the width of the table top 14.

The fastening element 18 is for example of the bracket type.

Owing to the invention described above, the passengers housed in a vehicle are better protected. In particular during collisions between a passenger and a table top due to accidents, the plastic deformation of such a fastening device makes it possible to absorb part of the energy from the impact, which decreases the energy passed on to the passenger and which could avoid a serious injury to the passenger.

The invention claimed is:

1. A device for fastening a table top to a side wall of a vehicle, the fastening device comprising:
    a structure for fastening to the side wall; and
    a support structure of the table top, defining a support surface extending in a substantially horizontal plane,
    the support structure comprising:
        at least one crosspiece extending along a transverse direction,
        at least two beams each extending between a junction end to said crosspiece and a fastening end to said fastening structure in a longitudinal direction substantially orthogonal to the transverse direction,
        said crosspiece being connected to each of said two beams,
    wherein each of the at least two beams has a bendable onset zone configured to deform plastically when a force greater than or equal to a predetermined threshold force is applied on said support structure along the transverse direction, so that each of said two beams pivots relative to said crosspiece about a pivot axis orthogonal to said transverse and longitudinal directions when a force greater than or equal to said predetermined threshold force is applied on said support structure along the transverse direction.

2. The fastening device according to claim 1, wherein the bendable onset zones include two first bendable onset zones, each arranged near the junction end of a respective beam of said two beams between the respective beam and said crosspiece, and two second bendable onset zones, said first and second bendable onset zones defining a substantially rectangular profile when no force is exerted on said support structure, each second bendable onset zone being arranged on a respective beam of said two beams.

3. The fastening device according to claim 2, wherein each beam comprises a movable portion that extends from the second bendable onset zone of said beam to the junction end of said beam, and a stationary portion that extends from the second bendable onset zone of said beam to the fastening end of said beam, said second bendable onset zone of each beam allowing pivoting of the movable portion of said beam relative to the stationary portion of said beam.

4. The fastening device according to claim 1, wherein:
    the bendable onset zones comprise two first bendable onset zones, each arranged near the junction end of a respective beam of said two beams between the respective beam and said crosspiece, and two second bendable onset zones, said first and second bendable onset zones defining a substantially rectangular profile when no force is exerted on said support structure,
    the fastening structure comprises two uprights each extending from the fastening end of one of said beams, substantially orthogonally to said beam, said uprights being configured to be fastened to the side wall of the vehicle, each second bendable onset zone being arranged on a respective upright of said two uprights.

5. The fastening device according to claim 4, wherein each upright comprises a transverse wall for fastening to the side wall of the vehicle, and a longitudinal wall extending along the longitudinal direction of the transverse wall up to the fastening end of one of said beams, and each second bendable onset zone is arranged near a connecting zone between the longitudinal wall and the transverse wall of the respective upright.

6. The fastening device according to claim 1, wherein at least one of the bendable onset zones is formed by a thinner zone of the crosspiece and/or the beam, the thinner zone having a thickness lower than an average thickness of the crosspiece and beams or formed by a zone of the crosspiece and/or beam comprising recesses.

7. The fastening device according to claim 6, wherein the recesses are circular.

8. The fastening device according to claim 1, further comprising:
    a side angle iron configured to be fastened to the side wall opposite one end of an edge of the table top.

9. A table for a vehicle, said table including the fastening device according to claim 8 and a table top, the table top resting on the support surface, an initial gap being present between the angle iron and the table when no force is exerted on said support structure, said gap being able to decrease substantially to zero after the plastic deformation of at least one bendable onset zone, the width of the initial gap advantageously being comprised between 10 and 20 millimeters.

10. The fastening device according to claim 1, the device being made in a single piece.

11. The table according to claim 9, including an element for fastening the crosspiece to the bottom surface of the table top, the fastening element being located substantially at the center of the width of the table top, the fastening element being of the bracket type.

* * * * *